United States Patent
Miyamoto (10) Patent No.: US 7,359,367 B2
(45) Date of Patent: Apr. 15, 2008

(54) DEVICE FOR PREVENTING ERRONEOUS SYNCHRONIZATION IN WIRELESS COMMUNICATION APPARATUS

(75) Inventor: Hiromitsu Miyamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 433 days.

(21) Appl. No.: 11/010,272

(22) Filed: Dec. 14, 2004

(65) Prior Publication Data

US 2005/0135528 A1    Jun. 23, 2005

(30) Foreign Application Priority Data

Dec. 18, 2003   (JP) .............................. 2003-420891

(51) Int. Cl.
  *H04J 3/06*   (2006.01)
  *H04B 7/212*  (2006.01)
  *H04B 1/38*   (2006.01)
  *H04Q 7/00*   (2006.01)

(52) U.S. Cl. ............... 370/350; 370/347; 370/324; 370/321; 370/328; 455/574; 455/502; 714/744; 714/798

(58) Field of Classification Search ............... 370/350, 370/347, 324; 455/502, 574; 714/744, 798
See application file for complete search history.

(56) References Cited

U.S. PATENT DOCUMENTS 4,816,989 A * 3/1989 Finn et al. .................. 709/248

5,539,751 A * 7/1996 Sabel ......................... 370/514
5,608,755 A * 3/1997 Rakib ......................... 375/219

(Continued)

FOREIGN PATENT DOCUMENTS

JP       5252128       9/1993

(Continued)

OTHER PUBLICATIONS

Japanese Office Action dated Nov. 13, 2007.

*Primary Examiner*—Duc M. Nguyen
*Assistant Examiner*—Daniel Lai
(74) *Attorney, Agent, or Firm*—Nixon Peabody LLP; Donald R. Studebaker (57) ABSTRACT

An erroneous synchronization preventing device includes a pattern detector detecting a sync pattern from received data with a broader sync window to output a sync detection notice and a sync timing. On receipt of the notice, a packet header detector checks an error in a header field of the received data, and, if detecting no error, outputs a header-normally-received notice, on receipt of which the timing corrector makes the inner timing synchronous with the sync timing to output a timing correction end notice. The mode manager in turn outputs a change notice. The pattern detector then detects the sync pattern with a narrower sync window. Unless the end notice is received within a predetermined period as from receipt of the change notice, a detection period monitor outputs an out-of-synchronism notice. The mode manager then outputs a restoration command for instructing detection of the sync pattern with the broader sync window. Disconnection of a communication link due to erroneous synchronization will be avoided.

4 Claims, 11 Drawing Sheets

U.S. PATENT DOCUMENTS

| | | | |
|---|---|---|---|
| 5,619,504 A * | 4/1997 | Van Grinsven et al. | 370/347 |
| 6,011,955 A * | 1/2000 | Tsuchiyama | 340/7.1 |
| 6,023,477 A * | 2/2000 | Dent | 370/350 |
| 6,072,847 A * | 6/2000 | Dupuy et al. | 375/356 |
| 6,185,429 B1 * | 2/2001 | Gehrke et al. | 455/502 |
| 6,212,398 B1 * | 4/2001 | Roberts et al. | 455/502 |
| 6,366,574 B1 * | 4/2002 | Baissus et al. | 370/350 |
| 6,522,665 B1 | 2/2003 | Suzuki et al. | |

FOREIGN PATENT DOCUMENTS

| | | |
|---|---|---|
| JP | 08-242201 | 9/1996 |
| JP | 2003134000 | 5/2003 |
| WO | WO99/07100 | 11/1999 |

* cited by examiner

DEVICE FOR PREVENTING ERRONEOUS SYNCHRONIZATION IN WIRELESS COMMUNICATION APPARATUS

BACKGROUND OF THE INVENTION

1. Field of the Invention

The present invention relates to a device for preventing erroneous synchronization in a digital wireless communication apparatus and, more particularly, to a device for preventing erroneous synchronization in a wireless communication apparatus switchably operating in its normal and power saving modes.

2. Description of the Background Art

As a digital wireless communication system, there is a system, such as the Bluetooth system, made up by a station supervising reference timing, referred to below as a reference or master station, and a dependent or slave station which receives the reference timing to maintain synchronism with the reference station. The slave station operates in its normal mode for performing communication, i.e. in its active state, and in a power saving mode for halting the communication to reduce power consumption, i.e. in its power saving state. The communication link between the reference and slave stations is maintained by acquiring timing sync signals (sync pattern) from each other. If the sync pattern is not acquired within a preset period, the communication link is disconnected. This preset period, which is a parameter dependent upon a system, is set to a default value of 20 seconds in the case of the Bluetooth system.

For example, the reference station transmits a sync pattern defining the reference timing at preset intervals to the slave station. The slave station receives the sync pattern sent from the reference station to maintain synchronism with the reference timing of the reference station. When receiving the sync pattern, the slave station opens a sync window of a preset duration in order to avoid the effect from the ambient noise, etc., as much as possible. The receiving window of a general wireless communication apparatus is standardized so as to allow for timing displacement of received packets on the order of ± several microseconds during the normal mode. This is however not applied to restoration from the power saving mode to the normal mode, but the user may set an arbitrary sync window length. Japanese patent laid-open publication No. 242201/1996 discloses a wireless communication apparatus configured for detecting a word sync character depending on the state of radio waves.

However, if the slave station goes to the power saving mode, the slave station stops acquiring the reference timing of the reference station to set itself the power-down, or sleep, state. In the sleep state, it is not possible anymore to correct the sync timing for assuring synchronism with the reference station. The system clocks of the reference and slave stations usually suffer from drift. If the system clocks of the reference and slave stations are asynchronous relative to each other, the timing of the system clocks of the slave station may be shifted to extend the sync window during the normal mode (on the order of ± several microseconds) from the system clocks of the reference station during this sleep period.

Thus, in reverting from the power saving mode to the normal mode, the slave station opens its receiving window (on the order of ± hundreds of microsecond) broader than the sync window for the normal mode (on the order of ± several microseconds) to receive the sync pattern to maintain the synchronism with the reference station in order to prevent disconnection of the communication link.

However, the above stated wireless communication apparatus suffers from the problem that the communication link may be disconnected by the following causes.

Figure 8:
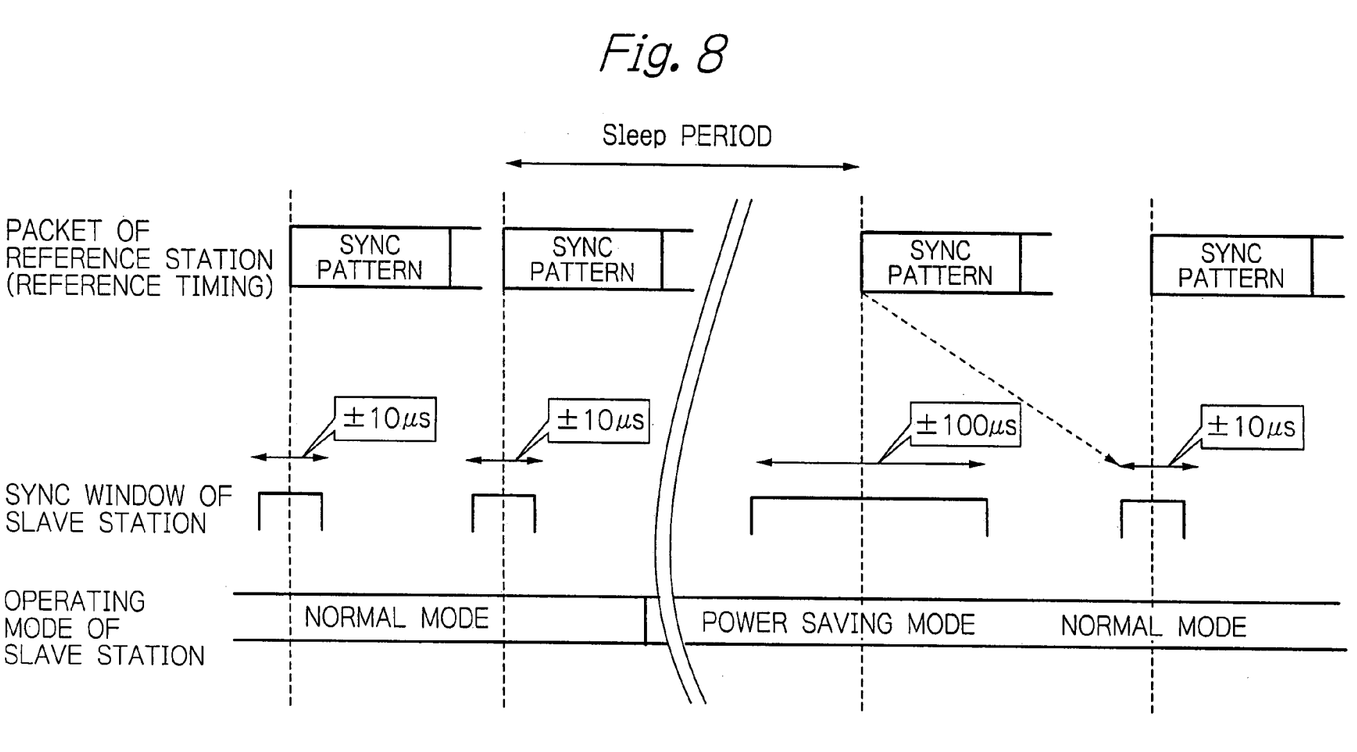
FIG. 8 is a time chart useful for understanding the method for detecting a sync pattern when the wireless communication apparatus switches from its power saving mode to its normal mode.

First, during restoration from the power saving mode to the normal mode, the sync window is expanded, with the consequence that the time needed for verifying the sync pattern is prolonged. Consequently, the risk of erroneous synchronization may be higher, e.g. with the ambient noise or with random data transmitted or received between other stations, such that the communication link will be disconnected due to the erroneous synchronization. For example, when operating in the normal mode, the slave station opens its sync window of period of ±10 µs in time with the transmitting timing of the sync pattern included in packets sent from the reference station to receive the sync pattern, as shown in FIG. 8. When reverting from the power saving mode to the normal mode, through the sleep mode, the slave station expands the sync window to ± several hundred microseconds to receive the sync pattern. The slave station then switches itself to the normal mode to restore the sync window of the period of ±10 µs.

Figure 9:
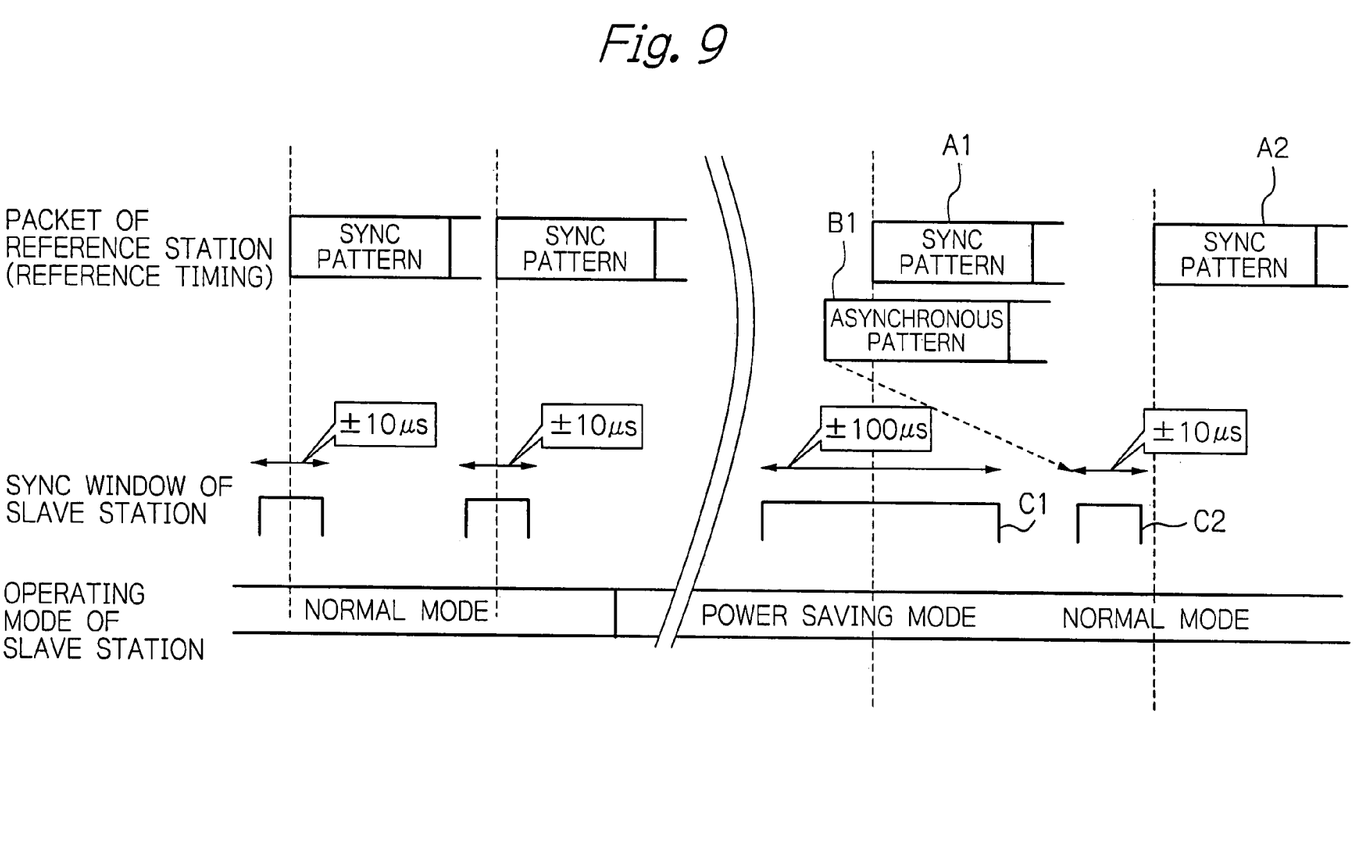
FIG. 9 is a time chart useful for understanding how the wireless communication apparatus erroneously synchronizes its inner timing when the apparatus switches from the power saving mode to the normal mode.

However, when the slave station has, as shown in FIG. 9, reverted from the power saving mode to the normal mode and opened the sync window C1 of ± several hundred microseconds, an erroneous detection of, e.g. the ambient noise (asynchronous pattern B1) by the slave station as a sync pattern A1 of the reference station causes the slave station to synchronize its inner timing with the asynchronous pattern B1 and then to switch itself to the normal mode to reset the sync window to the period of ±10 µs. Hence, if the timing of the asynchronous pattern B1 is shifted appreciably from the sync pattern of the reference station, the opening timing of a sync window C2 of the period of ±10 µs, at the time of restoration to the normal mode, is shifted from the timing of the sync pattern A2 sent by the reference station, with the result that the slave station is no longer able to receive the sync pattern of the reference station, thus leading to disconnection of the communication link.

Figure 10:
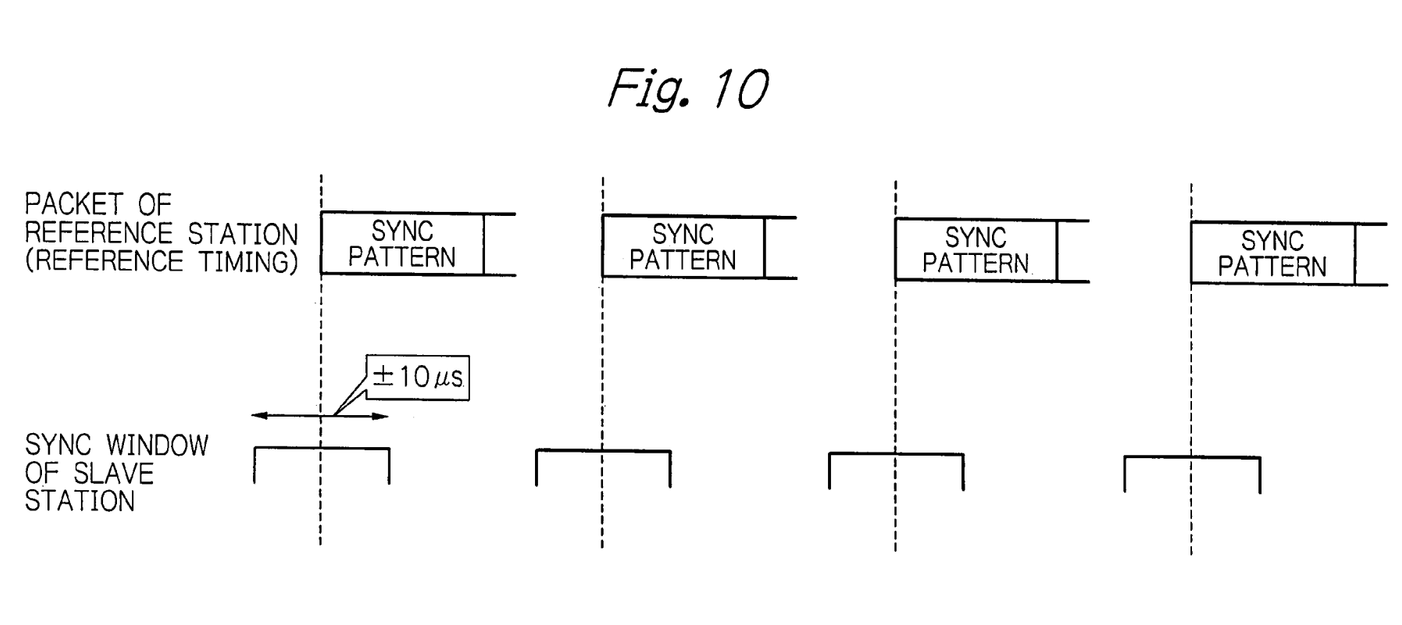
FIG. 10 is a time chart, like FIG. 8, useful for understanding the method for detecting a sync pattern when the wireless communication apparatus is operating under the normal mode.

If, during the operation of the slave station in the normal mode, erroneous synchronization has occurred twice or more times on end, such erroneous synchronization gives rise to disconnection of the communication link. During the normal mode, the slave station opens the sync window, in time with the sync pattern periodically sent as packets from the reference station, to receive the sync pattern, as shown in FIG. 10. Since the effect by, e.g. the ambient noise is diminished by setting the sync window to the period of ±10 µs, the probability of the erroneous detection of the sync pattern by e.g. the ambient noise is usually low to a certain extent. However, erroneous detection may still occur, depending on the surrounding states.

Figure 11:
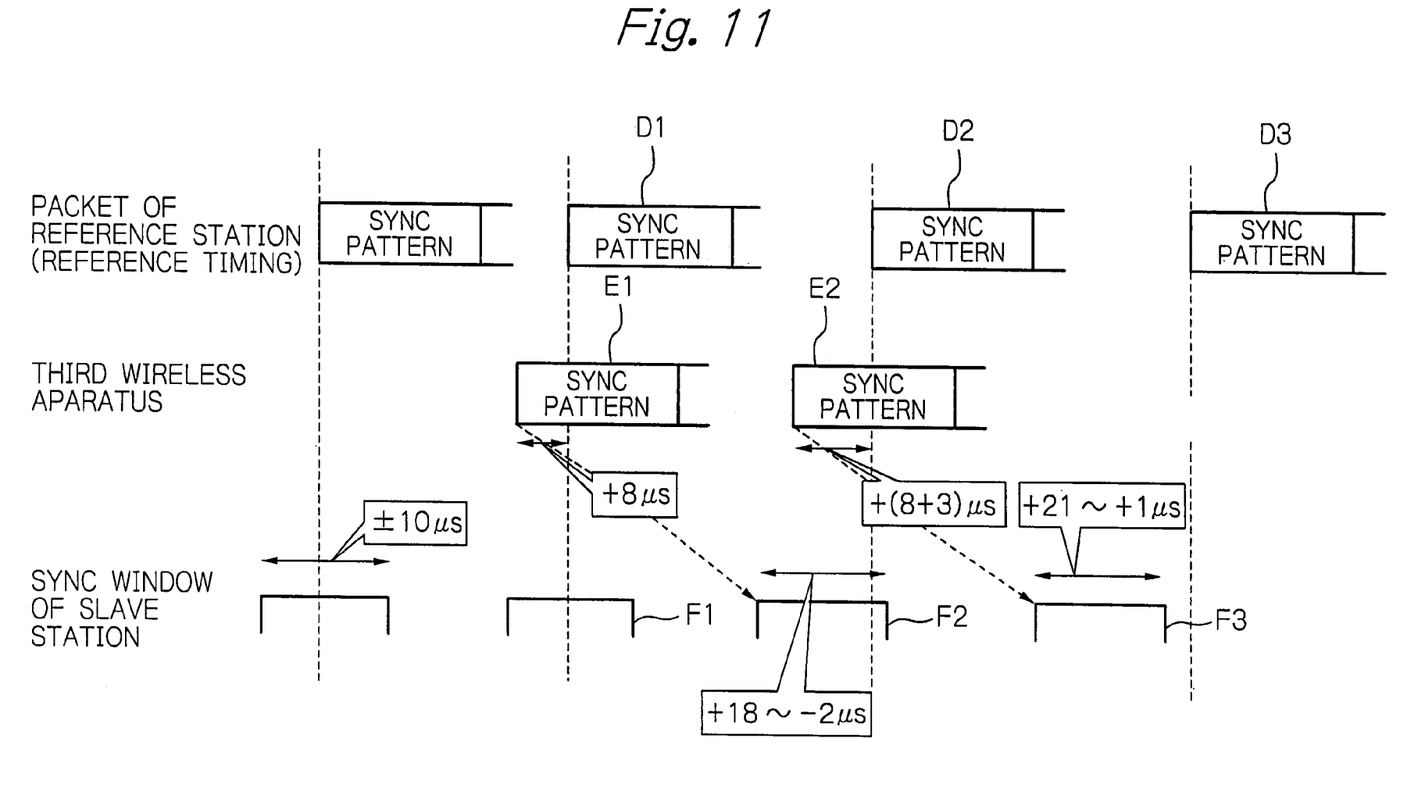
FIG. 11 is a time chart, like FIG. 9, useful for understanding how the wireless communication apparatus erroneously synchronizes its inner timing when the apparatus is operating under the normal mode.

For example, as shown in FIG. 11, when a third wireless communication apparatus, not communicating, calls the reference station twice on end, the third wireless communication apparatus transmits the same sync patterns E1 and E2 as the sync patterns D1 and D2 sent from the reference station. Thus, if the sync pattern E1, initially output from the third wireless communication apparatus, is shifted by 8 µs in the positive direction from the sync pattern D1 of the reference station, the timing of the sync pattern E1 falls within the sync window F1 of the slave station, and therefore the slave station detects the sync pattern E1 earlier than the sync pattern D1 from the reference station to synchronize its inner timing with the sync pattern E1.

Consequently, the sync window F2 following the sync window F1 is opened at a timing displaced by 8 µs in the positive direction from the transmitting timing of the sync pattern D2 of the reference station (+18 to −2 µs). Meanwhile, since the retrieval of the sync pattern is usually not carried out twice or more in the same sync window, the sync pattern D1, immediately following the sync pattern E1, of the reference station is not detected.

When the sync window F2 of the slave station is opened, if the second sync pattern E2 is sent from the third wireless communication apparatus to the reference station, and the transmitting timing of the sync pattern E2 is shifted by 11 µs in the positive direction from the sync pattern D2 of the reference station, the sync pattern E2 falls within the sync window F2, so that the slave station erroneously detects the sync pattern E2 as the sync pattern D2 from the reference station, and accordingly synchronizes its inner timing with the sync pattern E2. Consequently, the sync window F3 following the sync window F2 is opened at a timing shifted by 11 µs in the positive direction from the sync pattern D3 of the reference station (+21 to +1 µs), so that the slave station is no longer able to receive the sync pattern from the reference station, with out-of-synchronism then being sustained to lead to disconnection of the communication link.

SUMMARY OF THE INVENTION

It is therefore an object of the present invention to provide a device for preventing erroneous synchronization in a wireless communication apparatus in which it is possible to prevent erroneous synchronization of the inner timing caused, e.g. by noise to avoid the risk of disconnection of the communication link by the erroneous synchronization.

For accomplishing the above object, the present invention provides a device for preventing erroneous synchronization in a wireless communication apparatus operable in a power saving mode and in a normal mode for transmitting or receiving information in the form of packet, which device includes a mode manager for outputting a restoration command for instructing detection of a sync pattern with a broader sync window and a change notice for notifying change to a normal mode, a pattern detector for using a broader sync window and a narrower sync window than the broader sync window when the mode manager outputs the restoration command and the change notice, respectively, to detect the sync pattern contained in a sync field of the received information, a timing corrector for synchronizing inner timing in the apparatus with the sync pattern detected by the pattern detector, and a detection period monitor for outputting an out-of-sync notice to the mode manager when the pattern detector does not detect the sync pattern within a predetermined period as from the time the mode manager outputs the change notice. The mode manager outputs the restoration command to the pattern detector at the time of reversion from the power saving mode to the normal mode and on receipt of the out-of-sync notice from the monitor. The mode manager outputs the change notice to the pattern detector and to the detection period monitor when the timing corrector completes the processing of synchronization of the inner timing.

The present invention also provides a device for preventing erroneous synchronization in a wireless communication apparatus operable in a power saving mode and in a normal mode for transmitting or receiving information in a form of packet, which device includes a mode manager for outputting a restoration command for instructing detection of a sync pattern with a broader sync window and a change notice for notifying change to a normal mode, a pattern detector for using the broader sync window and a narrower sync window than the broader sync window when the mode manager outputs the restoration command and the change notice, respectively, to detect the sync pattern contained in a sync field of the received information, a normal receipt counter for monitoring successive detections of the sync pattern by the pattern detector, and a timing corrector for synchronizing the inner timing in the apparatus with the sync pattern detected by the pattern detector when a count of detections monitored by the normal receipt counter exceeds a predetermined value. The mode manager outputs the restoration command to the pattern detector at the time of reversion from the power saving mode to the normal mode. The mode manager outputs the change notice to the pattern detector when the timing corrector completes the processing of synchronization of the inner timing.

The present invention also provides a device for preventing erroneous synchronization in a wireless communication apparatus operable in a normal mode, which device comprises a pattern detector for using a narrow sync window to detect a sync pattern contained in a sync field of received data, and a detection period monitor for giving a first decision that out-of-synchronism occurs if the pattern detector does not detect the sync pattern within a predetermined period of time as from the time of detection of a previous sync pattern. The detection period monitor also gives a second decision that synchronization is restored if the pattern detector detects the sync pattern after the decision of the out-of-synchronism. The pattern detector changes the sync window to a broader sync window than the narrower sync window when the detection period monitor gives the first decision. The pattern detector resets itself to the narrower sync window when the detection period monitor gives the second decision.

According to the present invention, since an error in the sync pattern is detected with the aid of the error detecting function of the header field contained in a received packet, the inner timing in the apparatus can be corrected based on the sync pattern free from an error. Upon transition from the power saving mode to the normal mode, if the inner timing is erroneously synchronized so that the sync pattern cannot be detected, the sync window is expanded to detect the sync pattern. Hence, the reference timing of the reference station can be acquired positively, even if the inner timing is shifted by erroneous synchronization, so that it is possible to avoid the disconnection of a communication link to improve the channel quality.

Moreover, according to the present invention, the sync pattern obtained on detection of the sync pattern several times on end is deemed to be the sync pattern from the reference station. Hence, the probability of the inner timing being synchronized to an erroneous sync pattern may be decreased appreciably. Since the reference timing of the reference station can be acquired reliably, the problem of possible disconnection of a communication link due to erroneous synchronization may be avoided substantially completely to improve the channel quality further.

In addition, according to the present invention, the sync window can be expanded in order to retrieve the sync pattern, when the inner timing in the apparatus is shifted from the reference timing of the reference station due to the erroneous synchronization, in the course of the operation of the wireless communication apparatus in the normal mode. It is therefore possible to acquire the reference timing of a reference station, with the result that the problem of possible disconnection of a communication link may be avoided substantially completely to improve the channel quality.

BRIEF DESCRIPTION OF THE DRAWINGS

The objects and features of the present invention will become more apparent from consideration of the following detailed description taken in conjunction with the accompanying drawings, in which.

DESCRIPTION OF THE PREFERRED EMBODIMENTS

Figure 1:
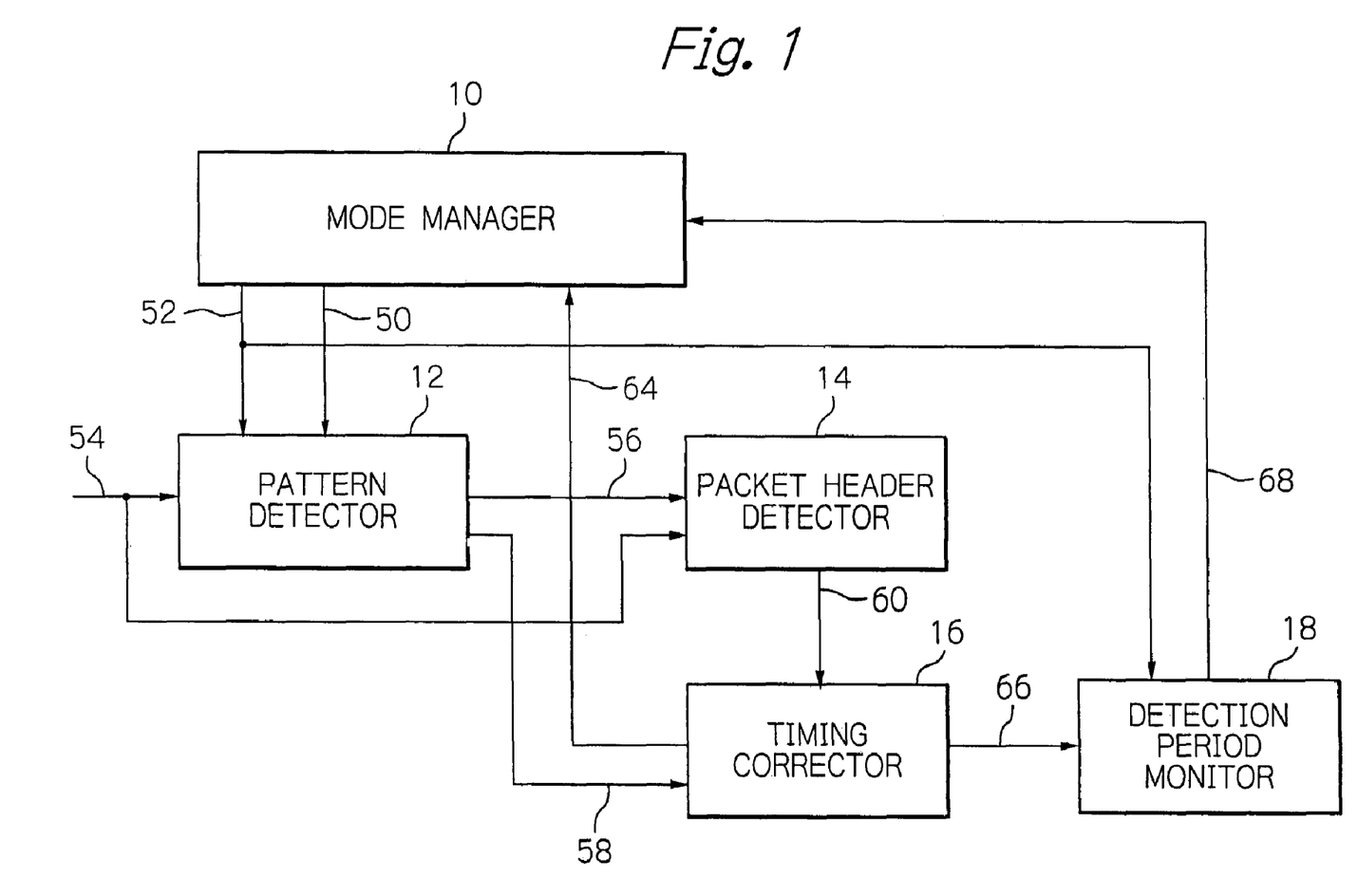
FIG. 1 is a block diagram schematically showing an embodiment of a device for preventing erroneous synchronization in a wireless communication apparatus according to the present invention.

Referring to the drawings, preferred embodiments of a device for preventing erroneous synchronization in a wireless communication apparatus according to the present invention will be described in detail. Referring first to FIG. 1, a device for preventing erroneous synchronization according to an embodiment of the present invention includes a mode management unit 10, a sync pattern detector 12, a packet header detector 14, a timing correction unit 16 and a sync pattern detection period monitor 18 interconnected as illustrated. With the present device, it is envisaged to prevent the erroneous synchronization of the inner timing, which would otherwise tend to be caused when the wireless communication apparatus reverts from its power saving mode to its normal mode, to avoid possible disconnection of a communication link ascribable to the erroneous synchronization.

The wireless communication apparatus, to which the device for preventing erroneous synchronization of FIG. 1 is applied, is a slave station which appropriately switches itself between two operating modes, namely the normal mode and the power saving mode. The mode management unit 10 is adapted to supervise the operating modes of the wireless communication apparatus. Specifically, when the wireless communication apparatus reverts from the power saving mode to the normal mode, the mode manager 10 outputs a restoration command 50 instructing the detection of the sync pattern with a broader synchronizing window to the pattern detector 12. In the following, signals are designated with reference numerals affixed to connections on which they are transferred. When the mode manager 10 receives a timing correction end notice 64 from the timing correction unit 16, the mode manager 10 outputs a mode change notice 52 giving a notice of change to the normal mode to the pattern detector 12 and the detection period monitor 18. Moreover, when the mode manager 10 receives a out-of-sync notice 68 from the detection period monitor 18, the mode manager 10 outputs a restoration command 50 to the pattern detector 12.

Figure 2:
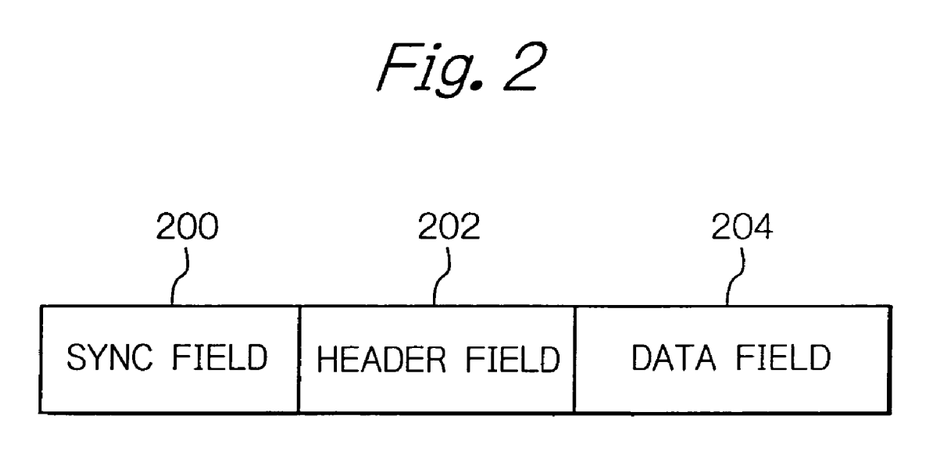
FIG. 2 shows an illustrative format of data received by the device for preventing erroneous synchronization shown in FIG. 1.

The wireless communication apparatus, to which the embodiment is applied, receives a packet sent from a reference station, not shown, and transfers the received packet as received data 54 to the pattern detector 12. Referring to FIG. 2, this packet is made up by a sync field 200 including a sync pattern, a header field 202 indicating a packet class, and a data field 204 storing user data. In the case of Bluetooth system, the sync field 200 is 68/72 bits long, the header field 202, 54 bits long, and the data field 204, 0 to 2746 bits long.

The pattern detector 12 is adapted to detect a sync pattern from the received data 54. Specifically, on receipt of the restoration command 50 from the mode manager 10, the pattern detector 12 opens a broader sync window (such as the period of ±100 μs), in time with the input of the received data 54, to retrieve the sync pattern contained in the sync field 200. On detection of the sync pattern, a sync detection notice 56 for notifying the detection is output to the packet header detector 14 to generate a sync timing 58 indicating the timing of the sync pattern to output the sync timing 58 to the timing corrector 16. It is noted that, upon receipt of a notice 52 for change to the normal mode from the mode manager 10, the pattern detector 12 opens a narrower sync window (such as the period of ±10 μs) to process the detection of the sync pattern.

The packet header detector 14 is adapted for detecting an error on the basis of the header field 202 of the received data 54. Specifically, on receipt of the sync detection notice 56 from the pattern detector 12, the packet header detector 14 identifies the header field 202 from the received data 54 and, using an error detecting code HEC (Header Error Check) contained in the header field 202, detects an error in the header field 202. Unless an error is detected, the packet header detector 14 outputs a header-normally-received notice 60 to the timing corrector 16.

Meanwhile, the sync field 200 generally has no error-detecting function, and hence is unable to detect an error in the sync pattern. However, since the error detecting code HEC is included in the header field 202, an error in the header field 202 may be detected using the error detecting code HEC. In the embodiment, an error is detected on the basis of the header field 202, and, if there is no error in the header field 202, it is determined that the probability of an error not included in the sync field 200 as well is high to avoid the apparatus from synchronizing its inner timing with the erroneous sync pattern.

Meanwhile, since the error detecting code CRC (Cyclic Redundancy Check) is included in the data field 204 of the packet as well, an error may be detected on the basis of the data field 204, using the error detecting code CRC. However, since in general the data field 204 is not necessarily present in the packet, the data field 204 is not the subject of error check in the embodiment.

The timing corrector 16 is adapted for synchronizing the inner timing of the apparatus to the reference timing of the reference station. Specifically, when the header-normally-received notice 60 is received from the packet header detector 14, the corrector 16 synchronizes the inner timing in the apparatus with the sync timing 58 given from the pattern detector 12. Since the sync timing 58 is synchronized with the reference timing of the reference station, the inner timing is synchronized with the reference timing of the reference station. When the synchronization processing for the inner timing is completed, the timing corrector 16 outputs timing correction end notices 64 and 66 to the mode manager 10 and to the detection period monitor 18, respectively. In the wireless communication apparatus, the transmission timing of a packet to be transmitted or the receipt timing of a received packet is determined on the basis of this inner timing.

The detection period monitor 18 is adapted to, upon transition to the normal mode, verify whether or not the inner timing in the apparatus is synchronized with the reference timing of the reference station. Specifically, upon receipt of the mode change notice 52, giving a notice of mode change from the power saving mode to the normal mode, from the mode manager 10, the detection period monitor 18 times the elapsing period of time as from the time of receipt. If the timing correction end notice 66 has not been received from the timing corrector 16 before a period of L seconds has elapsed, which is a parameter set by an upper layer station, where L is equal to unity or more, for example, the detection period monitor 18 then outputs a notice of out-of-synchronism 68. Meanwhile, if the sync pattern has not been detected within the predetermined period, the communication link is disconnected, while the parameter L is set to a value smaller than the predetermined period.

In the embodiment, the detection period monitor 18 generates the notice of out-of-synchronism 68, based on the timing correction end notice 66 output from the timing corrector 16. However, since the timing corrector 16 is engrossed in the processing for synchronizing the inner timing when the header-normally-received notice 60 is received from the packet header detector 14, the notice of out-of-synchronism 68 may be generated based on the header-normally-received notice 60. If emphasis is to be placed on simplifying the structure of the apparatus, the packet header detector 14 may be omitted, although the probability of the erroneous synchronization of the inner timing then becomes slightly higher.

Figure 3:
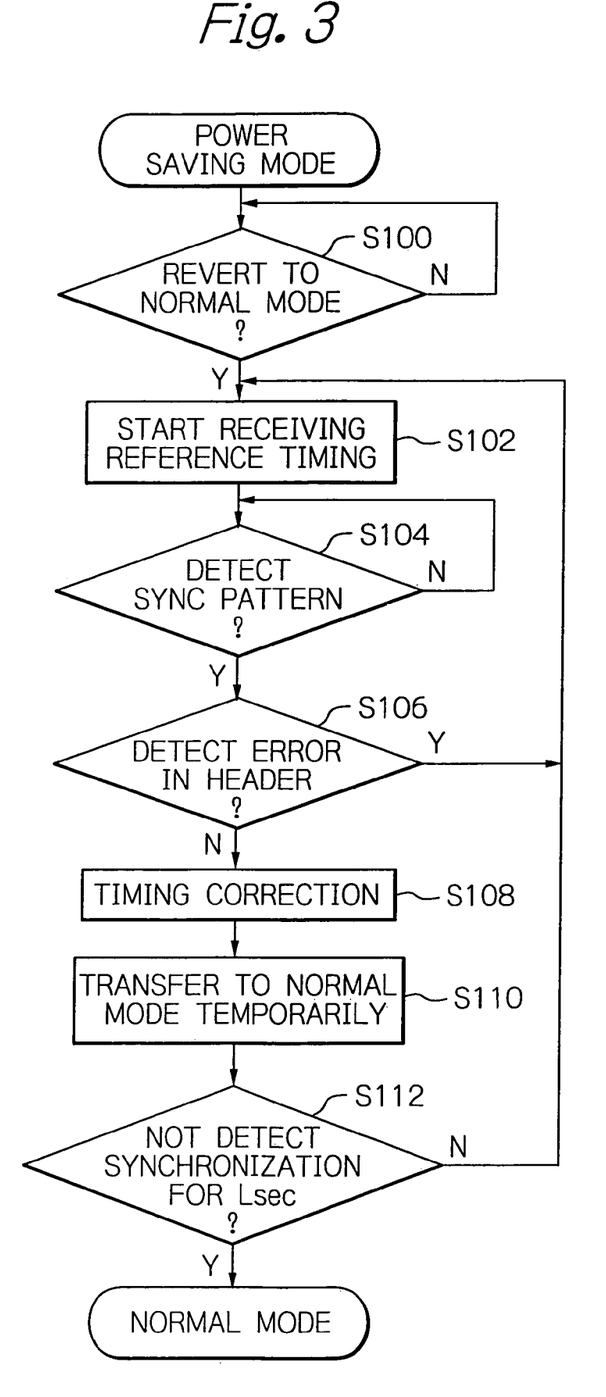
FIG. 3 is a flowchart specifically showing the operation of the device for preventing erroneous synchronization shown in FIG. 1.

Referring to the flowchart of FIG. 3, the operation of the device for preventing erroneous synchronization, designed as described above, will be described about the case of transition from the power saving mode to the normal mode. In the case of the opposite transition, i.e. from the power saving mode to the normal mode, the mode manager 10 outputs a restoration command 50 to the pattern detector 12. On receipt of the restoration command 50 (step S100, FIG. 3), the pattern detector 12 opens a sync window of the period of ±100 µs, in time to the input of the received data 54, to commence the processing of retrieving the sync pattern from the received data 54 (step S102).

On detection of the sync pattern, the pattern detector 12 outputs the sync detection notice 56 to the packet header detector 14, while outputting the sync detection notice 56 to the timing corrector 16 (step S104). Upon receipt of the sync detection notice 56, the packet header detector 14 detects errors on the basis of the header field 202 of the received data 54. If no error has been detected, the packet header detector 14 outputs the header-normally-received notice 60 to the timing corrector 16 (step S106). If there is an error in the header field 202, the steps S102 to S106 will be repeated.

On receipt of the header-normally-received notice 60 from the packet header detector 14, the timing corrector 16 synchronizes the inner timing in the apparatus to the sync timing 58 from the pattern detector 12 to thereby synchronize the inner timing in the apparatus with the reference timing of the reference station. On completion of the inner timing synchronizing processing, timing correction end notices 64 are 66 are output to the mode manager 10 and to the detection period monitor 18, respectively (step S108). Upon receipt of the timing correction end notice 64, the mode manager 10 outputs a mode change notice 52 advising a change from the power saving mode to the normal mode to the pattern detector 12 and to the detection period monitor 18 (step S110).

On receipt of the mode change notice 52 advising the change from the power saving mode to the normal mode, the pattern detector 12 reduces the sync window to the period of ±10 µs to detect the sync pattern. On the other hand, on receipt of the notice 52 of change from the power saving mode to the normal mode, the detection period monitor 18 commences timing the elapsing period of time. If the timing correction end notice 64 has not been received before lapse of L seconds, the detection period monitor 18 sends out the notice of out-of-synchronism 68 to the mode manager 10 (step S112).

On receipt of the notice of out-of-synchronism 68, the mode manager 10 outputs a restoration command 50 to the pattern detector 12. This causes restoration to the processing from the step S112 to the step S102, so that the steps S102 to S112 will be repeated. For example, the pattern detector 12 expands the sync window to the period of ±100 µs to start the detection of the sync pattern (step S102). However, if the notice of out-of-synchronism 68 is not output from the detection period monitor 18, the normal mode set in the step S110 is kept unchanged, with the pattern detector 12 detecting the sync pattern with the sync window of the period of ±10 µs.

Thus, in the instant embodiment, the error detection function of the packet header field 202 is exploited to check errors in the sync pattern, and hence the inner timing in the apparatus may be corrected based on the error-free syncpattern. Restoration from the power saving mode to the normal mode with a longer sleep period may frequently cause the inner timing to be appreciably shifted from the reference timing of the reference station. In particular to such a case, ambient noise may tend to be detected erroneously as the sync pattern. In the embodiment, the chance of this erroneous detection may be reduced.

Moreover, in the illustrative embodiment, it is monitored whether or not the sync pattern may be detected within a preset period of time as from the transition from the power saving mode to the normal mode to thereby verify the state of synchronization of the inner timing. If the inner timing is erroneously synchronized, restoration is made immediately to the power saving mode, and the sync window is expanded in order to detect the sync pattern. Hence, even if the inner timing is shifted due to erroneous synchronization, the reference timing of the reference station may positively be acquired to prevent the communication link from being disconnected to improve the network quality.

Figure 4:
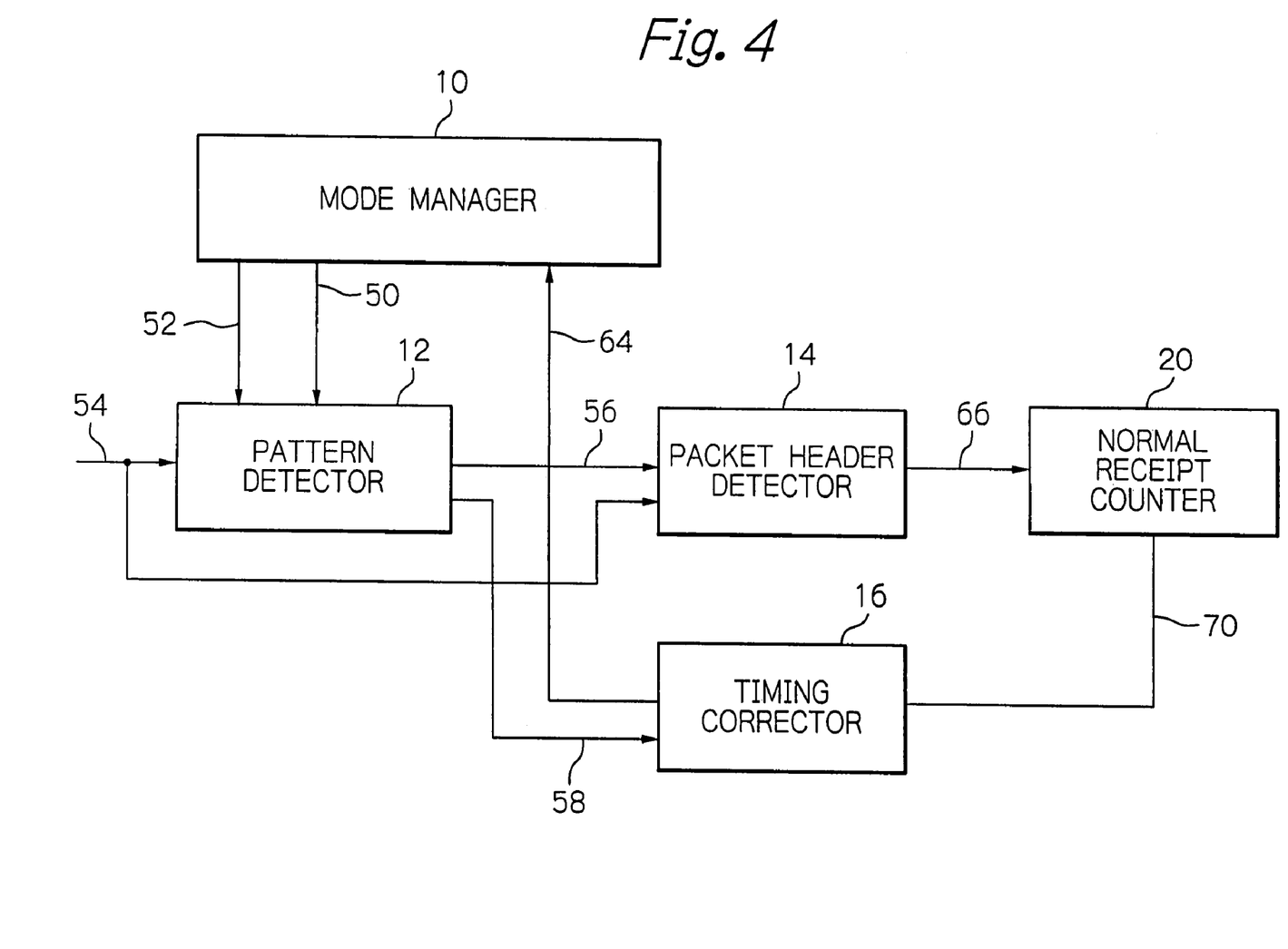
FIG. 4 is a schematic block diagram, like FIG. 1, showing an alternative embodiment of a device for preventing erroneous synchronization in a wireless communication apparatus according to the present invention.

FIG. 4 shows an alternative embodiment of the device for preventing erroneous synchronization in the wireless communication apparatus according to the present invention. In the alternative embodiment, the probability of the erroneous synchronization of the inner timing on restoration from the power saving mode to the normal mode is further lower than in the illustrative embodiment shown in FIG. 1. Specifically, the alternative embodiment may be the same as the embodiment shown in FIG. 1 except that a normal receipt counter 20 is provided in place of the detection period monitor 18 of FIG. 1. It is noted that, in the following, like parts or components as those shown in FIG. 1 are denoted with the same reference numerals.

The mode manager 10, the pattern detector 12, the packet header detector 14 and the timing corrector 16 may basically be the same as those designated by the corresponding reference numerals shown in FIG. 1. However, in the present embodiment, the mode manager 10 is adapted to output, if restoration is to be made from the power saving mode to the normal mode, a restoration command 50 instructing the start of detection of the sync pattern by a broader sync window to the pattern detector 12, and, upon receipt of the timing correction end notice 64 from the timing corrector 16, a mode change notice 52 notifying the pattern detector 12 of the change from the power saving mode to the normal mode.

The pattern detector 12 may be the same as the component bearing the same reference number in FIG. 1. However, the packet header detector 14 of the embodiment is adapted to output the header-normally-received notice 60 to the normal receipt counter 20 when the header field 202 does not have error. On receipt of a normal receipt count notice 70 from the normal receipt counter 20, the timing corrector 16 synchronizes the inner timing of the apparatus to the sync timing 58 imparted from the pattern detector 12. The normal receipt count notice 70 is indicative of the normal reception detected prescribed times.

The normal receipt counter 20 supervises the times where the header-normally-received notice 60 has been received from the packet header detector 14. When the count of successive receipts of the header-normally-received notice reaches the normal receipt threshold M, a parameter set by an upper layer station, where M is equal to two or more, for example, the normal receipt counter 20 sends out the notice 70 to the timing corrector 16. While the packet header detector 14 executes error correction on the header field 202, as described previously, the error code contained in the header field 202 is usually made up in many cases by redundant bits of short bit length. For example, in the Bluetooth system, eight redundant bits are used to check the validity of the header field.

However, when the redundant bit length is eight bits long, a random error involved in the header field causes a risk that the header with errors is erroneously recognized as being regular with a probability of $1/2^8 = 1/256$. In order to reduce the probability of error correction from $1/2^8$ further to a value close to 0%, it is sufficient that the error correction is carried out plural times. When the count of receipt of the header-normally-received notice 60 has reached the normal receipt threshold M, the normal receipt counter 20 deems that the detector 12 has continuously received the regular sync pattern as many as or more than the threshold M, and outputs the normal receipt count notice 70 to the timing corrector 16.

On receipt of the notice 70 from the normal receipt counter 20, as described above, the timing corrector 16 causes the inner timing to be synchronized with the sync timing 58 from the pattern detector 12. This notice 70 is output from the normal receipt counter 20 when the probability is extensively high that the sync pattern detected by the pattern detector 12 is the sync pattern transmitted from the reference station, that is, the inner timing is synchronized with the reference timing of the reference station. Thus, the problem of erroneous synchronization of the inner timing may be overcome substantially thoroughly.

Figure 5:
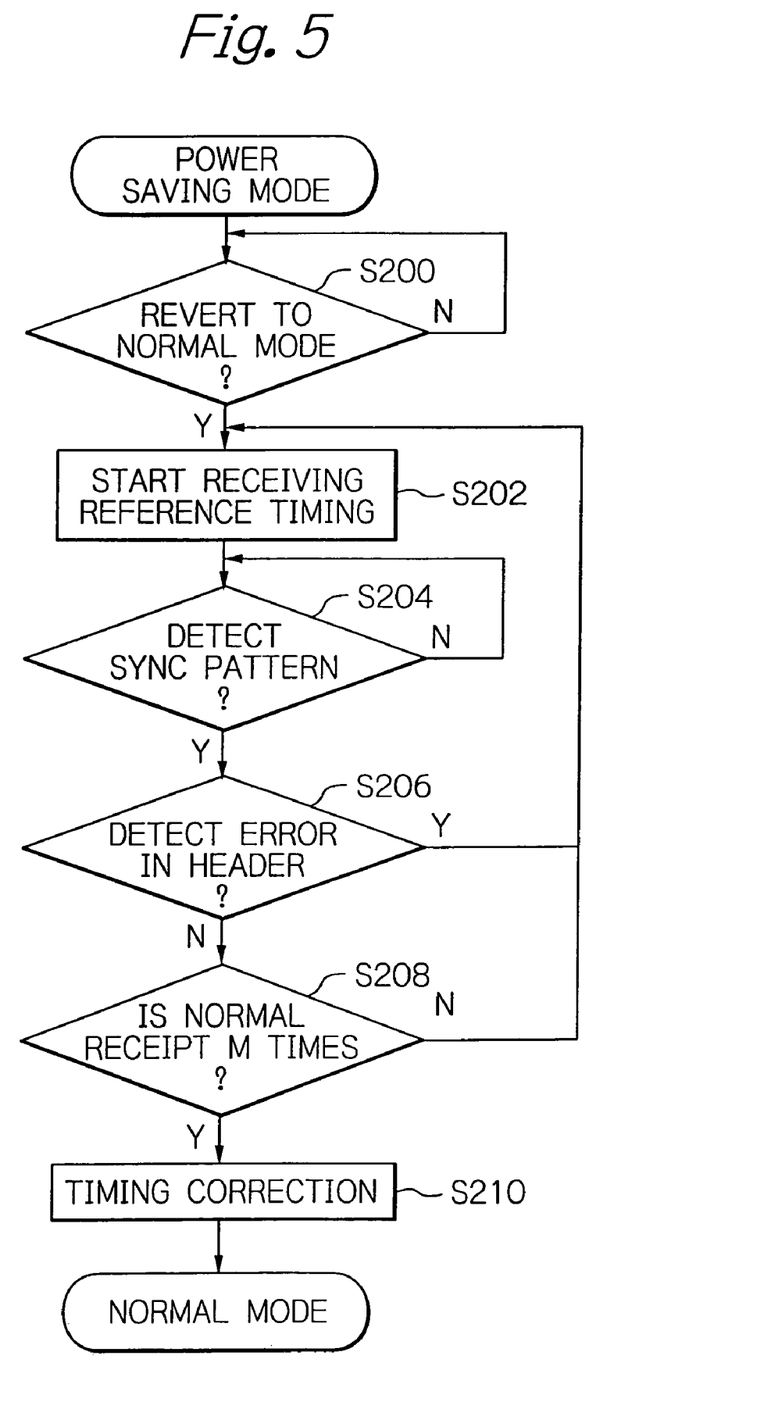
FIG. 5 is a flowchart, like FIG. 3, specifically showing the operation of the device for preventing erroneous synchronization shown in FIG. 4.

Referring to the flowchart of FIG. 5, the operation of the device for preventing erroneous synchronization will be described for the case of the restoration from the power saving mode to the normal mode. The steps S200 to S206 of FIG. 5 are the same as the steps S100 to S106 of FIG. 3. However, in the step S206, the packet header detector 14 outputs the header-normally-received notice 60 to the normal receipt counter 20, should there be no error in the header field 202. If there is no error in the header field 202, processing transfers to a step S208 and, otherwise, processing reverts to the step S202.

In the step S208, the normal receipt counter 20 counts the times where the header-normally-received notice 60 has been received from the packet header detector 14, and outputs the normal receipt count notice 70 when the count of successive receipts has reached the prescribed normal receipt threshold M. If the count of the normal receipts has reached the normal receipt threshold M, the control is transferred to a step S210 and, otherwise, the processing is reverted to the step S202.

On receipt of the notice 70 in the step S210, the timing corrector 16 causes the inner timing in the apparatus to be synchronized to the sync timing 58 from the pattern detector 12. On completion of the synchronizing, the timing correction end notice 64 is output to the mode manager 10. Upon receipt of the timing correction end notice 64 from the timing corrector 16, the mode manager 10 outputs a mode change notice 52 notifying the pattern detector 12 of the change from the power saving mode to the normal mode.

Hence, with the instant alternative embodiment, when plural sync patterns have been detected successively, the sync patterns detected are deemed to be regular sync patterns, and the inner timing of the apparatus is in turn corrected based on this sync pattern, so that the probability of the erroneous synchronization of the inner timing may be diminished appreciably. Consequently, even if the slave station has been kept in its sleep state for a long time such that the reference timing of the reference station is lost, there is no risk of the inner timing being regulated with an erroneous timing. Thus, the reference timing of the reference station may positively be acquired to prevent disconnection of the communication link by erroneous synchronization to further improve the network quality.

Figure 6:
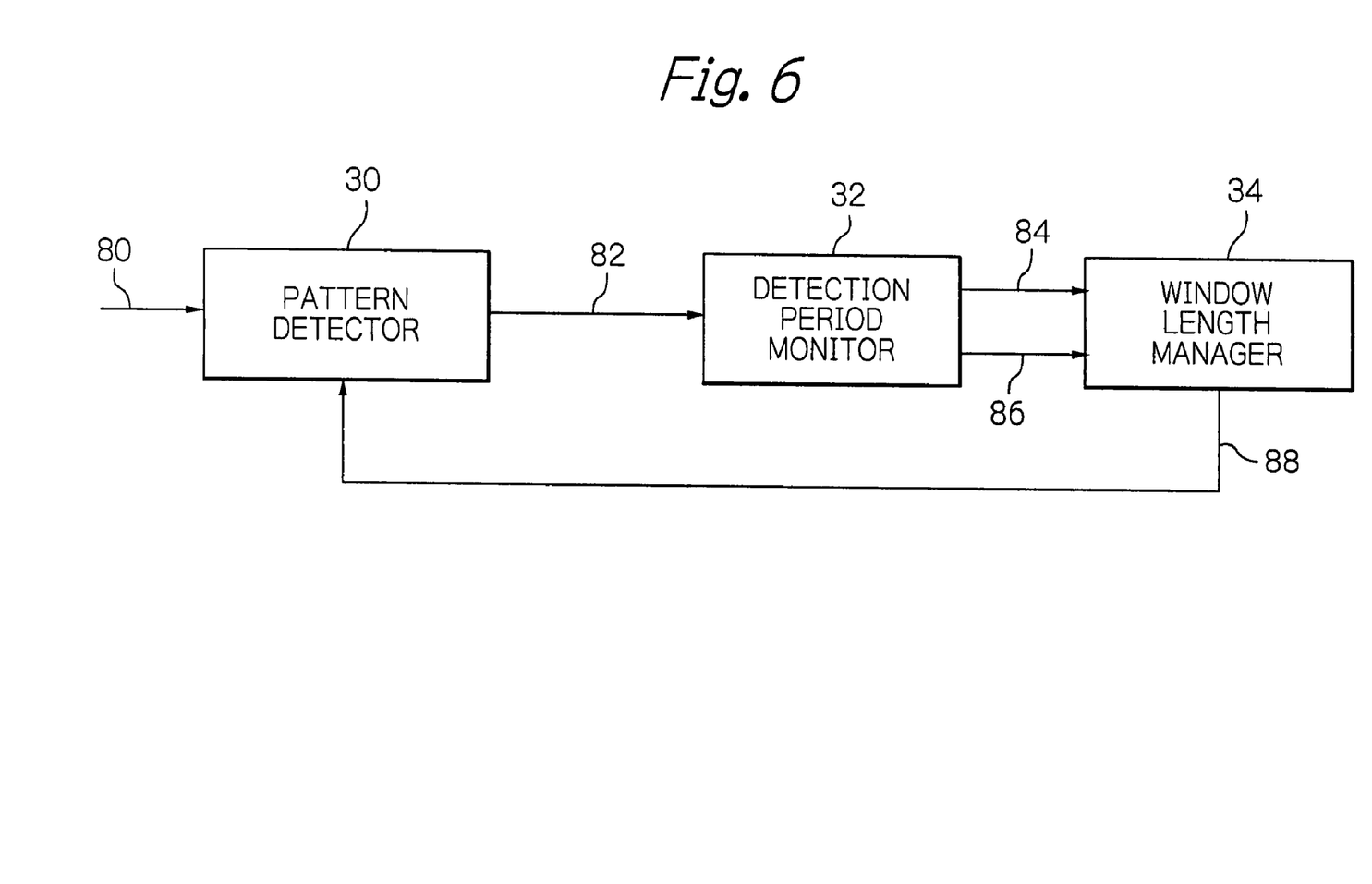
FIG. 6 is a schematic block diagram showing another alternative embodiment of a device for preventing erroneous synchronization in a wireless communication apparatus according to the present invention.

FIG. 6 shows another alternative embodiment of the device for preventing erroneous synchronization in the wireless communication apparatus according to the present invention. In the embodiment, the problem may be overcome that, when the wireless communication apparatus is operating in the normal mode, the inner timing of the apparatus would otherwise be erroneously synchronized thus to lead to disconnection of a communication link. Referring to FIG. 6, the device for preventing erroneous synchronization includes a pattern detector 30, a detection period monitor 32 and a window length manager 34 interconnected as shown. Such disconnection of a communication link during the normal mode operation would otherwise occur when the inner timing in the apparatus has become erroneously synchronized twice or more, as shown in FIG. 11. Meanwhile, the reference numerals affixed to the connections also represent signals appearing on the connections.

The wireless communication apparatus, to which the present embodiment is applied, may be the same as the wireless communication apparatus described with reference to FIG. 1. However, the device of this instant embodiment is adapted to operate when the wireless communication apparatus is operating in the normal mode. When in the normal mode, the wireless communication apparatus receives a packet transmitted at a preset interval from the reference station, and sends out the packet as received data 80 to the pattern detector 30. This packet is constructed as shown for example in FIG. 2, and the sync pattern is contained in the sync field 200.

When the operation in the regular mode is commanded from a mode manager, not shown, the pattern detector 30 opens a narrower sync window (such as the period of ±10 μs) in time to the input of the received data 80, to retrieve the sync pattern contained in the sync field 200. On detection of the sync pattern, the pattern detector 30 outputs a sync detection notice 82 notifying the detection, to the detection period monitor 32. The pattern detector 30 changes the sync window from a narrower one to a broader, such as the period of ±100 μs, or restores the sync window from a broader one to a narrower, in response to a command from the window length manager 34.

The detection period monitor 32 verifies, based on the sync detection notice 82 from the pattern detector 30, whether or not the inner timing is synchronized with the reference timing of the reference station. More specifically, on receipt of the sync detection notice 82 from the pattern detector 30, the detection period monitor 32 measures the elapsing time as from the time of receipt. In the case the next sync detection notice 82 has not been received until P seconds, a parameter set from the upper layer station have elapsed, where P is equal to unity or more, for example, the detection period monitor deems that the inner timing is shifted from the reference timing, and outputs an out-of-sync notice 84 to the window length manager 34. However, if the sync detection notice 82 is received after outputting of the out-of-sync notice 84, the detection period monitor 32 deems that the inner timing has become re-synchronized with the reference timing of the reference station and synchronization has been restored to accordingly output a sync restoration notice 86 to the window length manager 34.

The window length manager 34 is adapted to supervise the sync window length of the window opened at the time of sync pattern retrieval in the pattern detector 30. On receipt of the out-of-sync notice 84 from the detection period monitor 32, the window length manager 34 transfers a command 88 to the pattern detector 30 to expand the sync window length to the period of ±N ps, which may be ±100 μs for example, a parameter set by the upper layer station. Upon receipt of the sync restoration notice 86 from the detection period monitor 32, the window length manager 34 transfers a command 88 to the pattern detector 30 to restore the sync window length to its original value. The pattern detector 30 sets the sync window length in accordance with the command from the sync window length manager 34.

Figure 7:
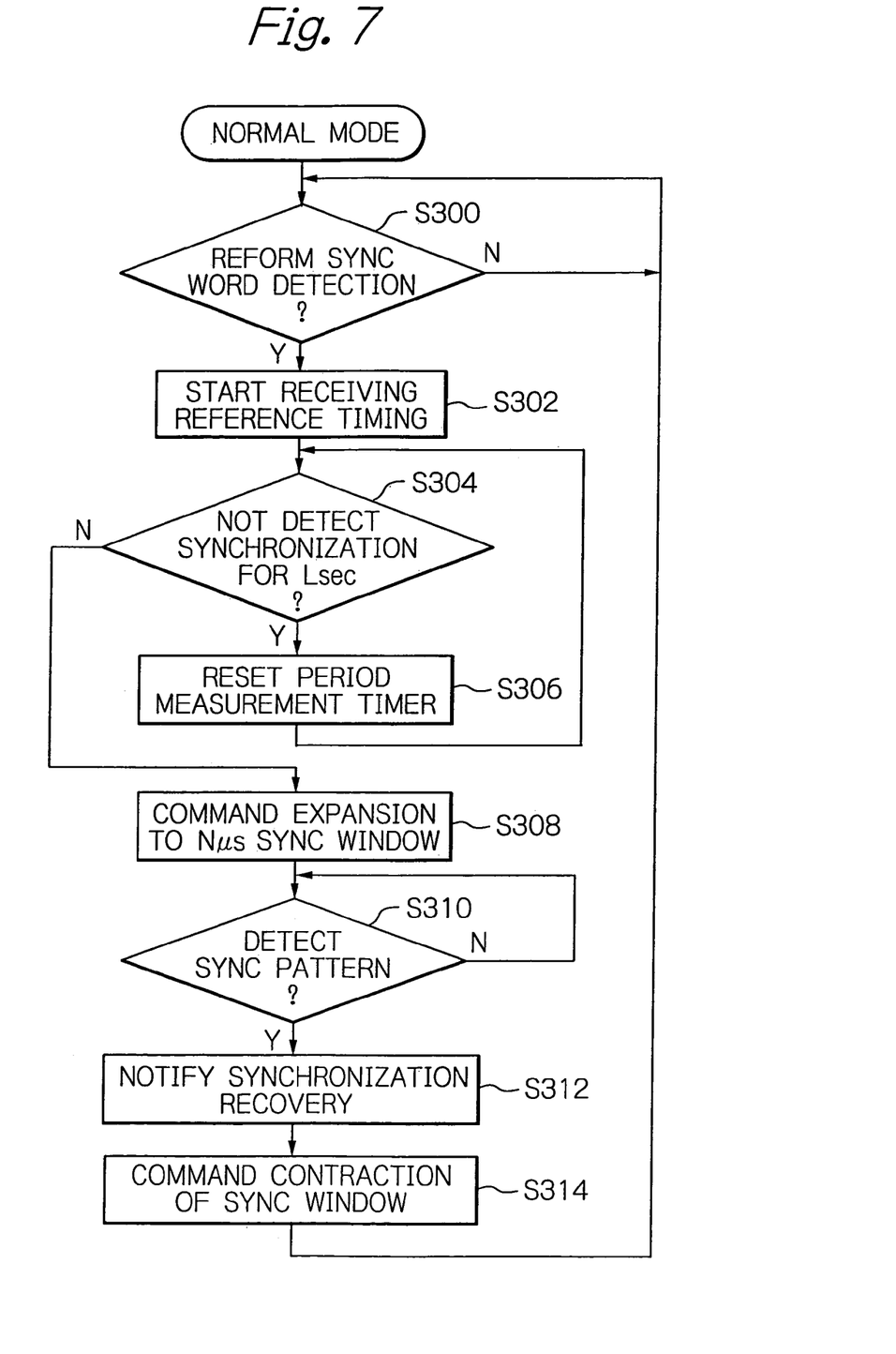
FIG. 7 is a flowchart, like FIG. 3, useful for understanding the operation of the device for preventing erroneous synchronization shown in FIG. 6.

The operation of the device for preventing erroneous synchronization, constructed as described above, will now be described with reference to the flowchart of FIG. 7. When the operation in the normal mode is commanded from the mode manager, not shown, (step S300, FIG. 7), the pattern detector 30 opens the narrower sync window to commence retrieval of the sync pattern (step S302). Specifically, in time to the receipt of the received data 80, the sync window of the period of, for example, ±10 μs is opened to retrieve the sync pattern contained in the received data 80. On detection of the sync pattern, the sync detection notice 82 is output to the detection period monitor 32.

On receipt of the sync detection notice 82 from the pattern detector 30, the detection period monitor 32 in a step S304 measures the elapsing time as from the time of the receipt, and waits for a sync detection notice 82 to be entered next. If the next sync detection notice 82 cannot be received within the period of P seconds, the detection period monitor 32 outputs an out-of-sync notice 84 to the window length manager 34. In this case, processing transfers to a step S308. However, on receipt of the next sync detection notice 82 within the next period of P seconds, for example, the timer for measuring the elapsing time is reset (step S306), and measurement of the elapsing time is re-commenced as from the time of receipt of the sync detection notice 82, while the input of the next sync detection notice 82 is waited for (steps S304 to S306).

On receipt of the out-of-sync notice 84 from the detection period monitor 32, in a step S308, the window length manager 34 commands the pattern detector 30 to enlarge the sync window length to the period of ±N μs, which may be ±100 μs, for example. The pattern detector 30 expands the sync window to ±100 μs, in accordance with the command by the window length manager 34, to continue the retrieval of the sync pattern. On detection of the sync pattern, the pattern detector 30 outputs the sync detection notice 82 to the detection period monitor 32 (step S310).

If, after outputting the out-of-sync notice 86 in the step S304, the sync detection notice 82 is received from the pattern detector 30, the detection period monitor 32 outputs the sync restoration notice 86 to the window length manager 34 (step S312). On receipt of the sync restoration notice 86 from the detection period monitor 32, the window length manager 34 commands the pattern detector 30 to revert to the narrower sync window (step S314). Processing then transfers from the step S314 to the step S302. The pattern detector 30 restores the sync window to the period of ±10 μs, in accordance with the command from the window length manager 34, to continue retrieving the sync pattern.

Thus, with the instant alternative embodiment, if, the inner timing in the apparatus in the normal mode being is erroneously synchronized twice on end with the sync pattern contained in the packet output, e.g. from a third slave station to shift the inner timing from the reference timing of the reference station, the reference timing of the reference station can newly be acquired because the sync pattern is retrieved with the enlarged sync window, thus making it possible to avoid the risk of disconnection of a communication link to improve the network quality.

The present invention may be applied to the Bluetooth system having the error detection function in a packet to be transmitted or received.

The entire disclosure of Japanese patent application No. 2003-420891 filed on Dec. 18, 2003, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A device for preventing erroneous synchronization in a wireless communication apparatus operable in a power saving mode and in a normal mode for transmitting or receiving information in a form of packet, said device including:
   a mode manager for outputting a restoration command for instructing detection of a sync pattern with a broader sync window and a change notice for notifying change to the normal mode;
   a pattern detector for using the broader sync window and a narrower sync window than the broader sync window when said mode manager outputs the restoration command and the change notice, respectively, to detect the sync pattern contained in a sync field of the received information;
   a timing corrector for synchronizing inner timing in the apparatus with the sync pattern detected by said pattern detector; and
   a detection period monitor for outputting an out-of-sync notice to said mode manager when said pattern detector does not detect the sync pattern within a predetermined period as from a time said mode manager outputs the change notice;
   said mode manager outputting the restoration command to said pattern detector at a time of reversion from the power saving mode to the normal mode and on receipt of the out-of-sync notice from said detection period monitor;
   said mode manager outputting the change notice to said pattern detector and to said detection period monitor when said timing corrector completes a processing of synchronization of the inner timing.

2. The device according to claim 1, further comprising:
   a packet header detector for using an error code contained in a header field, when said pattern detector detects the sync pattern, to detect an error in the header field of the received information;
   said timing corrector synchronizing an inner timing when said packet header detector detects a header field free from an error;
   said detection period monitor outputting the out-of-sync notice to said mode manager when said packet header detector does not detect a header field free from an error within a predetermined time as from a time of outputting the change notice by said mode manager.

3. A device for preventing erroneous synchronization in a wireless communication apparatus operable in a power saving mode and in a normal mode for transmitting or receiving information in a form of packet, said device including:
   a mode manager for outputting a restoration command for instructing detection of a sync pattern with a broader sync window and a change notice for notifying change to the normal mode;
   a pattern detector for using the broader sync window and a narrow sync window than the broader sync window when said mode manager outputs the restoration command and the change notice, respectively, to detect the sync pattern contained in a sync field of the received information;
   a normal receipt counter for monitoring successive detections of the sync pattern by said pattern detector; and
   a timing corrector for synchronizing inner timing in the apparatus with the sync pattern detected by said pattern detector when a count of detections monitored by said normal receipt counter exceeds a predetermined value;
   said mode manager outputting the restoration command to said pattern detector at a time of reversion from the power saving mode to the normal mode;
   said mode manager outputting the change notice to said pattern detector when said timing corrector completes a processing of synchronization of the inner timing.

4. The device according to claim 3, further comprising:
   a packet header detector for using an error code contained in a header field, when said pattern detector detects the sync pattern, to detect an error in the header field of the received information;
   said normal receipt counter monitoring successive detections of a header field free from an error by said packet header detector.

* * * * *